(12) United States Patent
Zwicker et al.

(10) Patent No.: US 11,617,469 B2
(45) Date of Patent: *Apr. 4, 2023

(54) BREWING MODULE AND DRINKS PREPARATION MACHINE

(71) Applicant: Tchibo GmbH, Hamburg (DE)

(72) Inventors: Dominic Zwicker, Nesslau (CH); Christian Schultheiss, Pfäffikon (CH); Johannes Federer, Winterthur (CH)

(73) Assignee: TCHIBO GMBH, Hamburg (DE)

( * ) Notice: Subject to any disclaimer, the term of this patent is extended or adjusted under 35 U.S.C. 154(b) by 649 days.

This patent is subject to a terminal disclaimer.

(21) Appl. No.: 16/613,583

(22) PCT Filed: May 16, 2018

(86) PCT No.: PCT/EP2018/062648
§ 371 (c)(1),
(2) Date: Nov. 14, 2019

(87) PCT Pub. No.: WO2018/210897
PCT Pub. Date: Nov. 22, 2018

(65) Prior Publication Data
US 2020/0077831 A1 Mar. 12, 2020

(30) Foreign Application Priority Data
May 19, 2017 (EP) .................................... 17172057

(51) Int. Cl.
*A47J 31/36* (2006.01)
*A47J 31/46* (2006.01)
*A47J 31/54* (2006.01)

(52) U.S. Cl.
CPC ....... *A47J 31/3633* (2013.01); *A47J 31/3638* (2013.01); *A47J 31/468* (2018.08); *A47J 31/54* (2013.01); *A47J 31/3676* (2013.01)

(58) Field of Classification Search
CPC ................ A47J 31/3633; A47J 31/3638; A47J 31/3623; A47J 31/3676
(Continued)

(56) References Cited

U.S. PATENT DOCUMENTS

2013/0276638 A1* 10/2013 Kristlbauer ........ B65D 85/8043
74/29
2015/0013279 A1  1/2015 Swerchesky
(Continued)

FOREIGN PATENT DOCUMENTS

EP     1 859 713         11/2007
EP       1859712 A1 *   11/2007   .......... A47J 31/3628
(Continued)

OTHER PUBLICATIONS

English translation of International Preliminary Report on Patentability dated Nov. 19, 2019, Application No. PCT/EP2018/062648, 6 pages.

*Primary Examiner* — Reginald Alexander
(74) *Attorney, Agent, or Firm* — Rankin, Hill & Clark LLP (57) ABSTRACT

A brewing module for preparing a brewed drink from a portion capsule, includes a first brewing module part and a second brewing module part, which is movable relative to a housing between a first brewing module part position and a second brewing module part position. An operating element is able to be brought manually from a first into a second operating element position, from which a movement is transmitted via a transmission mechanism into a movement of the second brewing module part. The transmission mechanism includes a cam disc that is rotatably mounted on the housing by the operating element wherein the second brewing module part is displaceable along a displacement stretch, which is fixed with respect to the housing, from a
(Continued)

first brewing module part position into the second brewing module part position by way of the cam disc being rotated by the operating element.

15 Claims, 3 Drawing Sheets

(58) Field of Classification Search
USPC .......................................................... 99/289 R
See application file for complete search history.

(56) References Cited

U.S. PATENT DOCUMENTS

| 2015/0017288 | A1  | 1/2015 | Lo Faro et al. |
| 2015/0164262 | A1* | 6/2015 | Dingle ............... B65D 85/8049 99/295 |
| 2017/0208987 | A1* | 7/2017 | Zhang ................... A47J 31/407 |
| 2020/0093317 | A1* | 3/2020 | Kroos ................. A47J 31/3633 |

FOREIGN PATENT DOCUMENTS

| EP | 2 485 629 | 1/2014 |
| EP | 2 907 427 | 8/2015 |
| JP | 2016-530914 A | 10/2016 |
| NO | 2014/114792 | 7/2014 |
| WO | 2010/118544 | 10/2010 |
| WO | 2015/039258 | 3/2015 |
| WO | 2015/048914 | 4/2015 |
| WO | 2016/087190 | 6/2016 |

\* cited by examiner

BREWING MODULE AND DRINKS PREPARATION MACHINE

BACKGROUND OF THE INVENTION

Field of the Invention

The invention relates to extraction appliances for preparing drinks or the like, from an extraction material, for example ground coffee, which is contained in a capsule. In particular, it relates to a brewing module for an extraction appliance, to a capsule recognition module, as well as to a drinks preparation machine with such a brewing module and/or capsule recognition module.

Description of Related Art

Extraction appliances for preparing drinks or the like from an extraction material present in a portion package are known, for example, as coffee machines or espresso machines. In many corresponding systems, the portion packages are designed as capsules, in which the extraction material is sealed, for example in an airtight manner. For extraction, the capsule is pierced, for example at two sides that are opposite to one another. An extraction fluid—generally hot water—is introduced at the first side. The extraction product is discharged from the capsule at the second side. This takes place in a so-called brewing module. Such a module includes a brewing chamber, in which the capsule is received. Brewing modules, with which the capsule is inserted and the brewing chamber is closed manually by way of an operating lever are particularly popular, wherein the capsule is automatically removed from the brewing chamber and ejected into a capsule container after the brewing procedure on renewed opening of the brewing chamber. Such brewing modules with an automatic capsule ejection are generally designed as horizontal brewing modules, i.e., the insertion of the capsule is effected from above, the closure of the brewing chamber is a horizontal relative movement of two brewing chamber parts, the brewing fluid flows essentially horizontally and the capsule container is formed below the brewing chamber.

The force to be applied on closing the brewing chamber and also on reopening is not constant. In the case of manually closable brewing modules, this results in the disadvantage that a compromise must be found with regard to the lever ratios and the transmission ratios. It is not possible to set/adjust the lever and transmission ratios such that, on the one hand, an easy actuation is also possible where a high force is required (for example, on piercing the capsule) and, on the other hand, a generally not too small a resistance results. Too small a mechanical resistance does not give the user any feedback and is not perceived as being haptically pleasant. Furthermore, the user perceives a sudden increase or drop of the mechanical resistance as an unpleasant jolting—and the appliance therefore acts in an inferior manner.

For this reason, a brewing device with a closure mechanism with a variable transmission ratio has been suggested in EP 1 859 713. However, the mechanism is complicated and less flexible.

SUMMARY OF THE INVENTION

An object of the present invention is to overcome the disadvantages of the state of the art and to provide a brewing module for preparing a brewed drink, as well as a drinks preparation machine, with regard to which the closing of the brewing chamber is effected in a manual manner and despite this a functionally and haptically satisfactory closure behaviour results, in particular without the mechanics becoming too complicated and necessitating too many individual parts.

According to the invention, a brewing module for preparing a brewed drink from a portion capsule is provided, the brewing module includes:

a housing;

a first brewing module part and a second brewing module part, which is movable relative to the housing between a first brewing module part position (opened brewing module) and a second brewing module part position (closed brewing module), wherein a brewing chamber is formed by the first and the second brewing module part in the second brewing module part position, the brewing chamber at least partly surrounding the portion capsule being located in the brewing position with the brewing procedure, wherein the brewing module is configured to brew a brewed drink by way of introducing a brewing fluid into the capsule and to discharge this out of the capsule; and an operating element, which can be brought manually from a first into a second operating element position, and a transmission mechanism for transmitting a movement of the operating element into a movement of the second brewing module part relative to the housing.

The transmission mechanism includes a cam disc, which is rotatably mounted on the housing, and which is with a first guide surface, wherein the second brewing module part, by way of the first guide surface, is displaceable along a displacement stretch that is fixed with respect to the housing, from a first brewing module part position into the second brewing module part position, by way of the cam disc being rotated by way of a movement of the operating element from the first into the second operating element position. The brewing module is characterised in that the first guide surface defines a transmission ratio that is variable along the first guide surface.

Herein, the transmission ratio varies significantly. In embodiment examples, it differs between the largest and the smallest value by at least a factor of 2, often by at least a factor of 4, 6, 8, 10 or more.

Hereinafter, the movement of the second brewing module part from the first into the second position is also denoted as a "closure movement" and the reverse movement as the "opening movement".

What is meant by a transmission ratio here is the ratio between the path covered by the second brewing module part on the one hand and the angular movement covered by the cam disc on the other hand. The transmission ratio at a certain position along the guide surface is defined by the position and orientation of the displacement stretch relative to the rotation axis of the cam disc as well as by the angle between the displacement part on the one hand and the guide surface on the other hand, at this position, when the cam disc is aligned such that the position is aligned to the displacement stretch.

In particular, the transmission ratio can be selected such that given a larger closure force it is smaller than where the closure force is small. By way of this, the course of the closure force for the user is at least partly compensated, and the mechanical resistance over the closure movement feels more uniform for the user than is known from the state of the art.

In particular, the transmission ratio in a first section of the guide surface which extends away from the first position can be larger than in a second section of the guide surface towards the second position. Then, at the beginning of the displacement stretch, where the mechanical resistance is merely effected by way of the friction and is small, a rapid advance of the brewing module part movement results, whereas a larger force exertion is possible towards the end of the displacement stretch when the capsule needs to be pierced.

In a special embodiment, the first guide surface includes at least three sections, of which in a first section, beginning at the first position, the transmission ratio lies in a first region, in a second section the transmission ratio lies in a second region and in a third section—towards the second position—the transmission ratio lies in a third region. Herein, the transmission ratio values in the first region are greater than those in the second and third region and the values in the second region are greater than those in the third region. For example, the path that corresponds to the first section has a greater extension along the displacement stretch than the respective path for the second and third section, for example also a greater extension than the paths that are affected by the second and third section together.

Herein, the first section can be selected and matched to the shape of the brewing chamber such that it effects the movement of the second brewing module part towards the capsule. The second section is selected such that it effects the movement of the second brewing module part on inserting the capsule into a seal and/or on piercing the capsule by the piercing elements. The third section is then selected such that it effects the movement of the second brewing module part in the last phase of the closure procedure, in which a medium-sized force is required. The moving of a capsule collar from a track that is formed by guide means, into another track, as is taught in WO 2015/048914, can necessitate a large force, and a section that corresponds to this movement—for example a second or also as a third section—can have a particularly small transmission ratio.

Apart from the first guide surface, the cam disc can also define a second guide surface, by way of which the second brewing module part is displaceable along the displacement stretch that is fixed with regard to the housing, from the second brewing module part position into the first brewing module part position.

The first and the second guide surface can be designed as boundaries of a guide opening in a cam disc (such an opening can be a continuous hole or a deepening). A for example pin-like guide element, which is connected to the second brewing module part, for example by way of it being integrally formed on this or being guided by this, then engages into this guide opening.

The second guide surface can be non-parallel to the first guide surface, i.e., it is not necessary for the transmission ratios to be equally large at a certain position of the second brewing module part with the closure movement and with the opening movement.

If the first and the second guide surface are boundaries of a common guide opening, then the width of the guide opening (the distance in the direction of the local movement direction) can be larger than the diameter of the guide element, i.e., the guide element at the most touches one of the two guide surfaces—depending on the state—but not both.

In particular, the second guide surface can run such that a variable transmission ratio is defined along it, for example likewise in sections and for example likewise substantially, with a factor between the largest and the smallest transmission ratio of at least 2, or at least a factor of 4, 6, 8, 10 or more.

The second brewing module part is movable relative to the housing, for example in a linear-translatory, in particular horizontal manner, i.e., the displacement stretch in particular is linear and horizontal. The first brewing module part can be assembled in a manner fixed with respect to the housing. However, one also does not rule out the first module part also being movable and, for example, executing a movement that is opposite to that of the second brewing module part.

The displacement stretch, which is fixed with respect to the housing, can be defined, for example, by a guide track, for example a guide groove, of the housing, into which track a guide element, for example a guide pin, which is connected to the second brewing module part, engages. Such a guide element can also interact with the guide surface, wherein then a section of the guide element engages into the guide track and another section interacts with the guide surface. For this purpose, such a guide element can optionally be provided with two bearings that are decoupled from one another, of which a first is in engagement with the guide track and a second with the guide surface.

In particular, the second brewing module part can be an injector, by way of which the portion capsule is pierced and from which, for example, hot water as a brewing fluid is introduced into the portion capsule. The first brewing module part can form a discharge device for leading the extraction product out of the capsule. For this purpose, it include for example extraction-side piercing elements for the extraction-side piercing of the capsule or other structures, the piercing elements opening the capsule at the extraction side. The reverse is also conceivable, i.e., the first brewing module part can form the injector and the second brewing module part can form the discharge device.

In particular, the operating element can be an operating lever, which can be brought from the first into the second position by way of a tilting movement from the top to the bottom. In the second position, for example the operating lever closes a capsule insert opening that is formed by a housing of the drinks preparation machine—for example of the brewing module.

In embodiments, the brewing module further includes a damping device for damping the movement of the second brewing module part. A damping device for damping a closing and opening movement of a brewing module is already known, for example, from EP 2 485 629. This is in combination with a spring drive given the opening moment and in particular serves for preventing too fierce an abutting on a stop taking place at the end of the opening movement. The damping device can function via inertia and friction, but also via friction alone, hydraulically, by way of air damping, magnetically, etc., and generally damps the closing and opening movement in a uniform manner.

In embodiments of the present invention, the damping device is designed such that it has non-constant damping characteristics as a function of the position and/or movement direction. For example, it can be designed such that it only damps along a part-stretch of the displacement stretch and/or only during the closure movement or only during the opening movement.

In particular, the damping device can be formed by way of two parts of the brewing module that are moved relative to one another—for example the cam disc and the housing or the second brewing module part and the housing—each having a contact portion that only comes into physical contact with one another and rub on one another on a part-stretch of the displacement stretch. Supplementarily or alternatively, one can envisage the one of the contact of portions being formed by a damping element which, with the closure movement and with the opening movement, is pressed against the other contact portion to a different extent—in particular not at all with the opening movement or with the closure movement.

In an embodiment, the damping element can be designed, for example, as an elastic element, which is movably received in a receiver of the respective part of the brewing module, wherein during the closure movement it is pressed against the other contact portion, whereas during the opening movement it can yield away from the other contact portion or vice versa.

The invention also relates to a drinks preparation machine with a brewing module of the discussed type.

BRIEF DESCRIPTION OF THE DRAWINGS

Embodiment examples of the invention are hereinafter described by way of figures. In the figures, the same reference numerals describe the same or analogous elements. There are shown in.

DETAILED DESCRIPTION OF THE INVENTION

Figure 1:
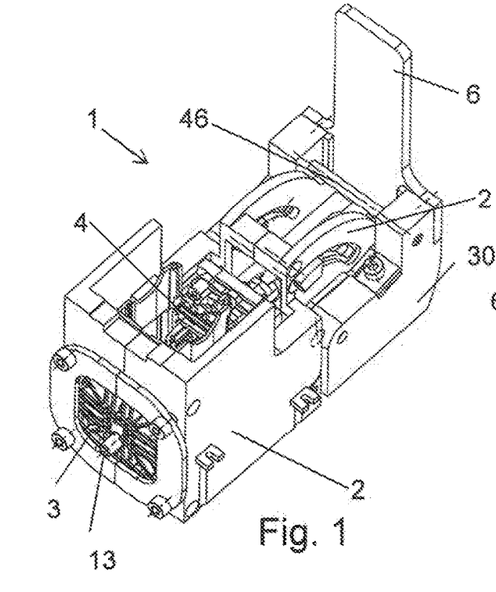
FIGS. 1 and 2 show, in each case, a view of a brewing module in the opened and in the closed state.
Figure 2:
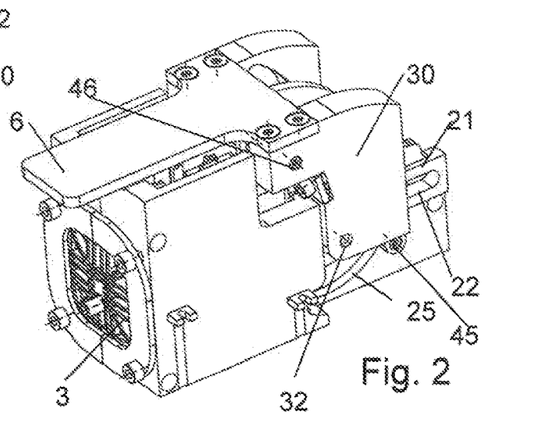
Figure 3:
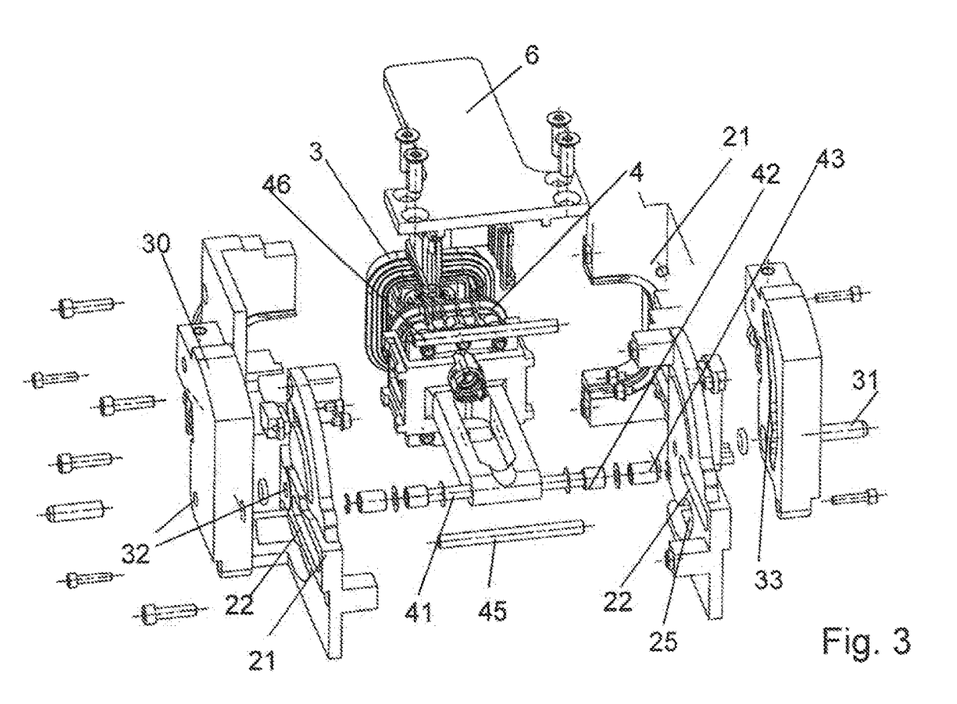
FIG. 3 shows an exploded representation of the brewing module of FIGS. 1 and 2.

The brewing module 1 according to FIGS. 1-3 includes a brewing module housing 2. Two brewing module parts, which are movable relative to one another, specifically a discharge device 3 and an injector 4 are guided in the brewing module housing 2. The housing here includes two housing side-parts 21.

The injector 4 includes perforation elements for piercing a portion capsule that is at least partly filled with an extraction material—for example, ground coffee. The injector 14 is configured to introduce a fluid—for example, hot water—through the perforation elements or past these into the pierced capsule, wherein the water can be fed via a water feed (not shown), which can include, for example, a flexible tube.

With the embodiment example described here, the discharge device 3 also includes perforation elements, specifically extraction-side piercing tips. These can be designed, for example, as is described in WO 2015/039258 or in WO 2010/118544 or have another design, and the application of principles other than piercing tips, for example with grating-like structures, are also possible.

As is known per se, for preparing a brewed drink, a capsule is placed between the discharge device 3 and the injector 4, and these are moved towards one another such that a brewing chamber encompassing the capsule is formed between these. The hot water is fed under pressure through the injector to the capsule, and the extraction product flows through the discharge device 3 via a drinks outlet 13 into a drinks vessel, which, for example, is placed therebelow.

The relative movement of the second brewing module parts (injector) relative to the first brewing module part (discharge device) in the embodiment example described here is achieved by way of the discharge device 3 being assembled in a manner in which it is fixed to the housing, whereas the injector 4 is movable along the horizontal axis.

Before the preparation of a brewed drink, the user inserts a capsule via a capsule insert opening, which is arranged on the housing at the upper side, the capsule being held at the height that is envisaged for this by way of suitable means, as described, for example, in WO 2015/048914, until the brewing chamber is closed. Such an insertion of the capsule into the brewing chamber can be effected in a direct manner, or as described in WO 2016/087190, in an indirect manner by way of the capsule firstly being held at a position above the brewing chamber, for example for the purpose of a capsule recognition.

The brewing module include an operating lever 6 for the operation by the user for the purpose of closing the brewing chamber, the operating lever being fixedly fastened to a cam disc arrangement, which is composed of two cam discs 30. The cam discs for their part are each pivotably mounted relative to the housing about a pivot 31, which is arranged in each case in a bore 32 in the respective housing side-part 21 and in the respective cam disc 30. The two cam discs 30 are connected to one another via a first and a second optional stabilisation pin 45, 46, in order to give the cam disc arrangement additional stability A second housing guide track 25, in which the first guide pin 45 can be loosely or guidingly moved given a pivoting movement of the cam disc arrangement, is arranged in each case in the two housing side parts, for the first guide pin 45.

Furthermore, in each case a first horizontal housing guide track 22, which defines the displacement stretch which is fixed with regard to the housing, is formed on the housing side-parts 21. A guide pin 41, which is fixedly connected to the second brewing module part 4, engages through the housing guide track 22 in each case into a guide opening 33 of the cam discs 30.

For this purpose, the guide pin here on both sides includes a first plane bearing 42 and a second plain bearing 43, which is decoupled from this with regard to rotation. The first plane bearing 42 is engaged with the housing guide track 22, whereas the second plane bearing 43 projects into the corresponding guide opening 33.

On account of the guide surfaces, which are formed by the guide opening, a pivoting movement of the cam discs 30 on actuating the operating lever 6 is converted into a displacement movement of the second brewing module part 4 along the displacement stretch that is defined by the housing guide tracks 22.

Figure 4:
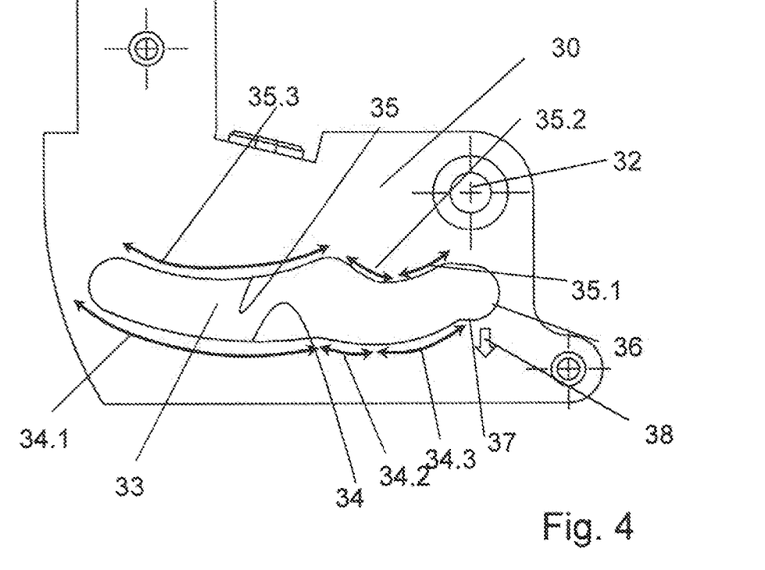
FIG. 4 shows a cam disc of the brewing module of FIG. 1-3.

As FIG. 4 particularly shows, the guide opening 33 on account of its shape forms a first guide surface 34 and a second guide surface 35, which is not parallel to this, the guide surfaces effecting a displacement of the brewing module part given the closure movement and/or given the opening movement. The non-constant transmission ratio is effected by way of the guide surfaces describing a path, which is different from an Archimedes spiral, runs with the bore 32 as the middle point.

In the represented embodiment example, the first guide surface 34 includes a first section 34.1 with a comparatively large transmission ratio. In a second section 34.2, a significantly smaller transmission ratio is defined, so that the user does not require too much force, for example, on piercing the capsule and/or on moving the capsule collar from one track into the other track. In a third section 34.3, the transmission ratio is mediums-sized. In the corresponding third region of the displacement stretch, for example the piercing tips are inserted completely into the capsule and the capsule is possibly slightly compressed between the brewing module parts, which is why a medium-sized force effort is required. The transition from a small to a medium-sized transmission ratio between the second and the third section (the resistance per displacement stretch, able to be felt by the user, increases again) prevents a sudden yielding after the effected jumping of the capsule collar from one track into the other track, as is described in WO 2015/048914; such a sudden yielding is perceived by the user as a jolting and on account of jolt-like loads can also have a negative effect on the service life of the brewing module.

For illustration: In an embodiment, the transmission ratio in the first section is between 0.6 mm/° and 2.5 mm/° (the transmission ratio does not need to be constant within the respective section, but can indeed vary), in the second section between 0.1 mm/° and 0.2 mm/° and in the third section between 0.2 mm/° and 0.4 mm/° . For example, by way of the first section the second brewing module is pushed to the front by approx. 25 mm within an approx. 30° lever movement, in the second section by 2-3 mm within a 15° lever movement and in the third section by 10-12 mm within a 40° a lever movement. Of course, very different numbers are also possible, and the optimum depends on the specific geometry, the selected materials and possibly also the damping device. In any case, the difference between the different transmission ratios along the path is substantial.

The second guide surface 35 for the reverse path likewise includes three sections. A first section 35.1 with a medium-sized transmission ratio serves for the initial opening of the brewing chamber and the first step in the process of removing the capsule. In a second section 35.2, the transmission ratio is small since, for example, a large force is necessary in order to withdraw the capsule further amid deformation, so that it can subsequently drop downwards. In a third section 35.3, the transmission ratio is large, so that not too large a path of the operating element is necessary for opening the brewing chamber to a sufficient extent given a small mechanical resistance.

The transmission ratios and the paths that are covered and effected by the second guide surface can roughly correspond to the values of the first guide surface, wherein the third section of the first guide surface corresponds to the first section of the second guide surface, the second sections correspond to one another and the first section of the first guide surface corresponds to the third section of the second guide surface.

An example of a brewing chamber is described in WO 2015/048914, in which the capsule, on closing the brewing chamber and on renewed opening of the brewing chamber, is subjected to different mechanical loads in different phases, which is why differently large closing and opening forces are to be exerted. The present invention however is not limited to brewing chambers of the type which is described in WO 2015/048914, concerning which the force to be exerted on closing and/or opening is not constant over the whole path.

A special optional feature is likewise represented in FIG. 4. The guide opening 33 of the cam disc 33 towards its inner end forms an end section, in which the first guide surface 34 merges via a shoulder 37 into a slightly undercut portion. This effects a clamping of the arrangement, i.e., when on brewing an outwardly directed force acts on the second brewing chamber part due to the inner pressure that is produced in the brewing chamber, this effects a force introduction 38 by the guide pin into the cam disc, the force on account of the undercut counteracting an opening movement—the guide pin is therefore pressed into the undercut end-section, as is represented by the block arrow, which symbolises the force introduction 38. In this context therefore the design is self-locking.

Figure 5:
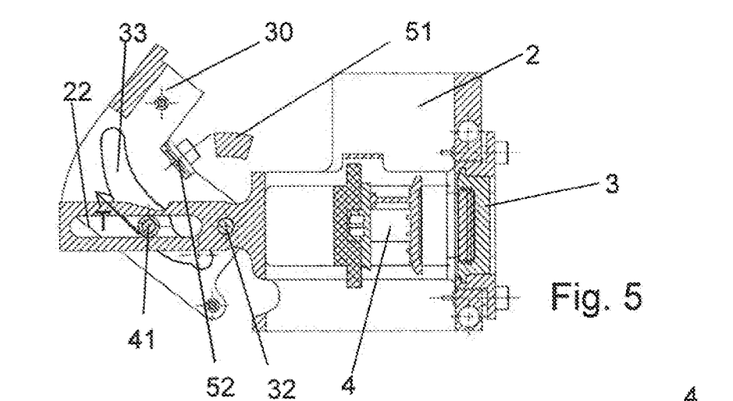
FIGS. 5 and 6 show, in each case, a simplified sectioned representation of the brewing module during the closure and opening procedure.

FIG. 5 in a sectioned manner shows the brewing module given the closure movement, wherein the guide pin is displaced to the right in FIG. 5 in the first housing guide track 22 by way of the abutting on the first guide surface when the cam disc 30 is pivoted in the clockwise direction. The transmission ratio in the represented embodiment is determined on the one hand by the angle between the tangent T to the guide surface 33 at the location of the contact with the guide pin 41 and on the other hand by the movement direction, which is defined by the housing guide track 22—in the represented example the horizontal. The shallower this angle, the larger is the transmission ratio. A more complicated relation between the transmission ratio and the course of the guide surface results when the movement direction, different to the embodiment example discussed here, does not run radially to the rotation axis (which is defined by the bore 32).

Figure 6:
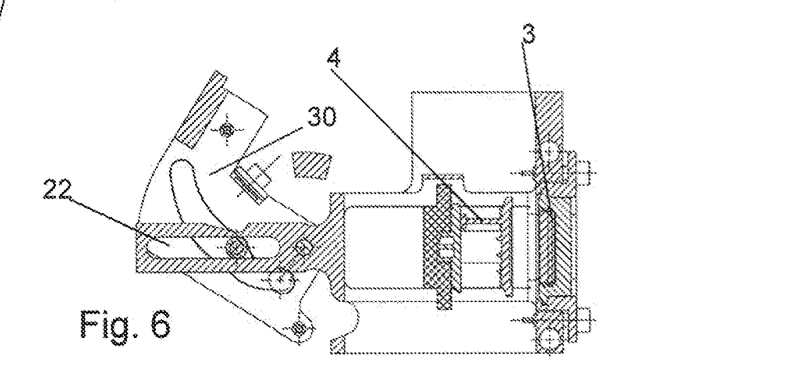

FIG. 6 shows the corresponding representation with the opening movement by way of a pivoting of the cam disc in the anti-clockwise direction.

A damping device is also illustrated in FIGS. 5 and 6, the damping device being formed by a damping element 52 and a sliding surface that interacts with this. In the present example, the damping element is herein present on the cam disc and the sliding surface arranged in a manner fixed with respect to the housing, for example, is formed by the housing or is formed on an element that is arranged in a fixed manner with respect to the housing. However, it could also be the other way around; generally the damping device according to the principle described herein requires two parts that are moved relative to one another during the opening and the closing procedure and between which friction can result on a part of the closure path and/or possible also of the opening path.

Figure 7:
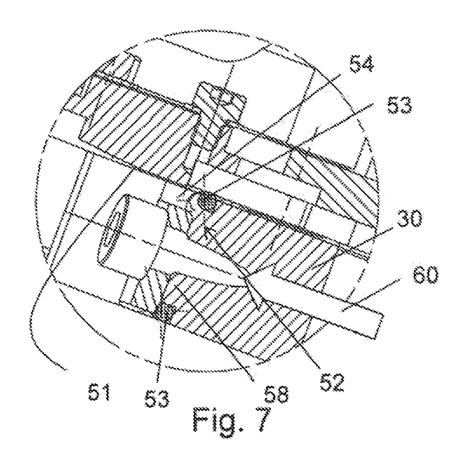
FIG. 7-9 show a detail of a sectioned representation of the brewing module, which renders the damping device easily visible, during different phases.
Figure 8:
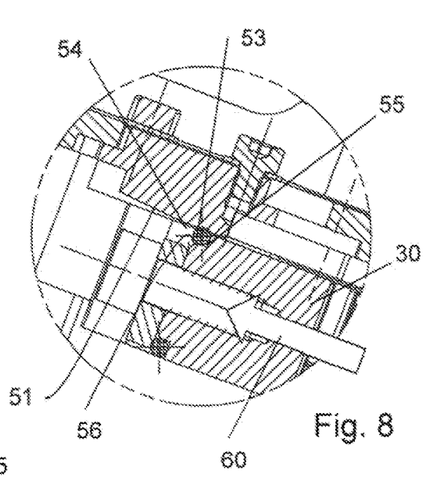
Figure 9:
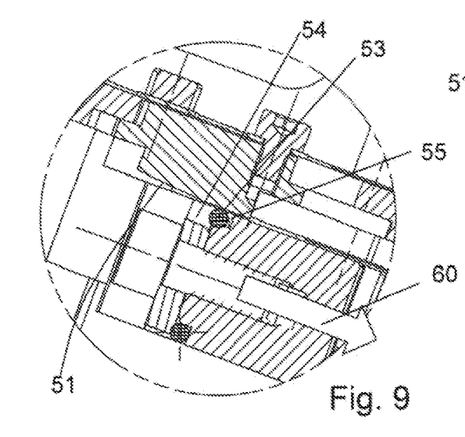

FIGS. 7-9 show a detail of the brewing module with a damping element 52 and with a sliding surface 51 in different stages.

The damping element includes an elastic element—here a damping ring 53 that extends around a guide portion 58. The damping ring is arranged in a receiver 54 that is provided for this, and is partly movable in this.

FIG. 7 shows the situation during the closure procedure, concerning which the cam disc 30 is moved in the direction of the movement direction 60 to the housing (cf. FIG. 5), and specifically shortly before the end phase of the closure procedure, for example when particularly high forces act upon the second brewing chamber part. The damping ring is located loosely in the receiver 54, without physical contact with a part that is fixed with respect to the housing: there is no damping.

The situation which occurs shortly afterwards, thus towards the end of the closure procedure, is represented in FIG. 8. The damping ring 53 abuts on the sliding surface 51 and on account of the forwards movement (movement direction 60) of the cam disc is pressed into a narrowing 55, which results between the receiver and the sliding surface 51, and which is dimensioned such that the damping ring only has space therein under definition. For this reason, the damping ring presses against the sliding surface 51 on account of its elasticity and a friction resistance, which counteracts a forward movement results. In the shown embodiment example, this friction resistance gradually reduces during the further forwards movement since the sliding surface 51 does not run completely parallel to the movement direction but in a slightly chamfered manner, thus is designed in a receding manner.

During the opening movement (FIG. 9, movement direction 60), the onset of friction between the sliding surface 51 and the damping ring 53 does not press this into the narrowing 55 but permits a yielding out of this into a region, in which the damping ring 53 has space without deformation. For this reason, there is only a minimal friction between the damping ring 53 and the sliding surface 51, i.e., the opening movement is not prevented.

If the damping ring 53 is located outside the narrowing 55 during the approach to the sliding surface 51 during the closing movement, an optional oblique surface 56 together with the intrinsic elasticity of the damping ring and its coming into contact with the sliding surface 51 ensures that the damping ring is pressed into this during the phase, which is represented in FIG. 8.

Instead of a damping ring, another, for example, elastic damping element, for example, an elastic lip, can also be used. The damping element is preferably arranged and designed such that when it comes into contact with the sliding surface, it is deformed in the one direction by way of a movement relative to the sliding surface and exerts an elastic force upon the sliding surface, the force counteracting the deformation, whereas it can yield given a movement in the other direction and can slide along the sliding surface in an essentially force-free manner. Given an elastic lip, this is achieved by way of the lip not being perpendicular to the sliding surface, but at a non-right-angle thereto.

Figure 10:
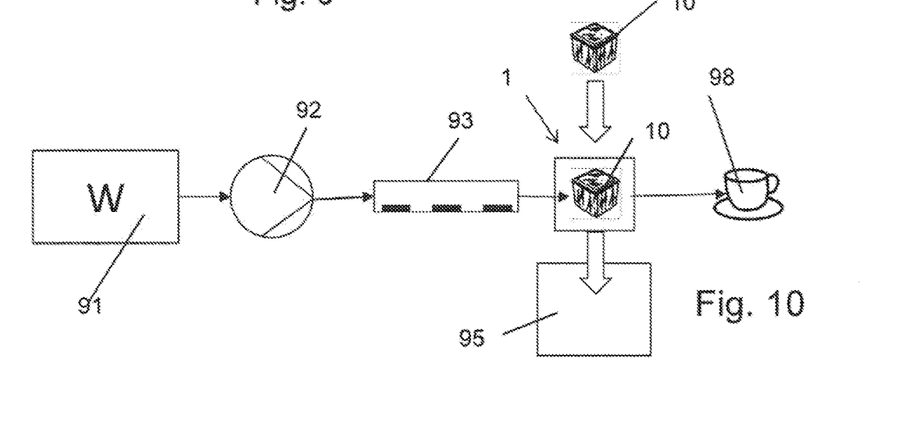
FIG. 10 shows a schematic diagram of the coffee machine according to the invention.

A machine according to the invention, for preparing a brewed drink from a portion capsule 10, here specifically a coffee machine, with a brewing module 1, is schematically represented in FIG. 10. Apart from the brewing module, it includes a water tank 91, a pump 92 for feeding brewing water to the injector 4 and a water heating device 93 (for example, a continuous heater). Furthermore, a capsule container 95, into which the capsules 1 drop or are transported after the brewing process is arranged below the brewing module. The reference numeral 98 indicates a coffee cup.

LIST OF REFERENCE NUMERALS 1 brewing module
2 brewing module housing
3 discharge device
4 injector
6 operating lever
13 drinks run-out
21 housing side-part
22 first housing guide track
25 second housing guide track
30 cam disc
31 pivot
32 bores for the pivot
33 guide opening
34 first guide surface
34.1 first section
34.2 second section
34.3 third section
35 second guide surface
35.1 first section
35.2 second section
35.3 third section
36 end-section
37 shoulder
38 force introduction on brewing
41 guide pin
42 first plane bearing
43 second plane bearing
45 first stabilisation pin
46 second stabilisation
51 sliding surface
52 damping element
53 damping ring
54 receiver
55 narrowing
56 oblique surface
58 guide portion
60 movement direction
91 water tank
92 pump
93 water heating device
95 capsule container
98 coffee cup

The invention claimed is:

1. A brewing module for preparing a brewed drink from a portion capsule, comprising:
   a housing;
   a first brewing module part and a second brewing module part, which is movable relative to the housing between a first brewing module part position and a second brewing module part position, wherein a brewing chamber is formed in the second brewing module part position, said brewing chamber at least partly surrounding the portion capsule being located in the brewing position with the brewing procedure, wherein the brewing module is configured to brew a brewed drink by way of introducing a brewing fluid into the first capsule and to discharge this out of the portion capsule;
   an operating element, which can be brought manually from a first into a second operating element position,
   a transmission mechanism for transmitting a movement of the operating element into a movement of the second brewing module part relative to the housing, wherein the transmission mechanism comprises a cam disc which is mounted on the housing, in a manner being rotatable by the operating element, the cam disc having a first guide surface, wherein the second brewing module part, by way of a guide element connected to the second brewing module part and engaging with the first guide surface, is displaceable along a displacement stretch being fixed with respect to the housing, from the first brewing module part position into the second brewing module part position by way of the cam disc being rotated, and the first guide surface defines a transmission ratio which is variable along the first guide surface, wherein the first guide surface comprises at least a first section, with which the guide element engages when the second brewing module part is in the first brewing module position, and a second section, with which the guide element engages after the second brewing module part has been moved away from the first brewing module position towards the second brewing module position wherein an angular movement of the cam disc causes the second brewing module part to be displaced away from the first brewing module position with a first section transmission ratio when the guide element engages with the first section and subsequently, when the guide element engages with the second section, with a second section transmission ratio further away from the first brewing module position, wherein the second section transmission ratio is smaller than the first section transmission ratio.

2. The brewing module according to claim 1, wherein the operating element is an operating lever which can be brought from the first into the second operating element position by way of a tilting movement from top to bottom, and wherein the operating element in the second operating element position closes a capsule insert opening.

3. The brewing module according to claim 1, wherein the second brewing module part is movable relative to the housing in a linear-translatory, horizontal manner and the first brewing module part is assembled in a manner fixed with respect to the housing.

4. The brewing module according to claim 1, wherein the transmission ratio along the first guide surface varies by at least a factor 2.

5. The brewing module according to claim 1, wherein the cam disc further defines a second guide surface, by way of which the second brewing module part is displaceable along the displacement stretch being fixed with regard to the housing, from the second brewing module part position into the first brewing module part position.

6. The brewing module according to claim 5, wherein the first guide surface and the second guide surface are designed as boundaries of a common guide opening in the cam disc.

7. The brewing module according to claim 6, comprising a guide element which is connected to the second brewing module part and engages into the guide opening.

8. The brewing module according to claim 5, wherein the first guide surface and the second guide surface are not parallel.

9. The brewing module according to claim 1, wherein the second brewing module part is displaceable in a linear-translatory manner between the first and the second brewing module part position, and wherein the housing comprises a corresponding linear housing guide track which defines the displacement stretch.

10. The brewing module according to claim 9, wherein the guide element is a guide pin, and wherein the guide pin is also engaged with the housing guide track.

11. The brewing module according to claim 10, wherein the guide pin in particular comprises a first bearing for the engagement into the housing guide track and a bearing which is separate thereto for the engagement with the first guide surface.

12. The brewing module according to claim 1, comprising a damping device for damping the movement of the second brewing module part, said damping device being configured such that it has non-constant damping characteristics as a function of the position and/or movement direction of the second brewing module part.

13. The brewing module according to claim 12, wherein the first and second brewing module parts each comprise a contact portion which only come into physical contact with one another and rub on one another on a part-stretch of the displacement stretch and/or wherein the one of the contact of portions is formed by a damping element which with the closure movement and with the opening movement is pressed against the other contact portion to a different extent.

14. A drinks preparation machine, comprising a water feed, a pump and a water heater as well as a brewing module according to claim 1.

15. The brewing module according to claim 1, wherein the first guide surface further comprises a third section defining a third section transmission ratio, the third section transmission ratio being smaller than the second section transmission ratio.

* * * * *